United States Patent
Kuo

(10) Patent No.: US 8,793,030 B2
(45) Date of Patent: Jul. 29, 2014

(54) POWER SAVING METHOD FOR A TEMPERATURE-CONTROLLED ELECTRICAL HEATING FOOD PROCESSING DEVICE

(75) Inventor: Hwaihsiang Kuo, Tainan County (TW)

(73) Assignee: Tsann Kuen (Zhangzhou) Enterprise Co., Ltd., Zhangzhou, Fujian (CN)

( * ) Notice: Subject to any disclaimer, the term of this patent is extended or adjusted under 35 U.S.C. 154(b) by 404 days.

(21) Appl. No.: 13/384,427

(22) PCT Filed: Jul. 28, 2010

(86) PCT No.: PCT/CN2010/075500
§ 371 (c)(1),
(2), (4) Date: Jan. 17, 2012

(87) PCT Pub. No.: WO2011/012073
PCT Pub. Date: Feb. 3, 2011

(65) Prior Publication Data
US 2012/0123609 A1 May 17, 2012

(30) Foreign Application Priority Data
Jul. 31, 2009 (CN) .......................... 2009 1 0305101

(51) Int. Cl.
| F24C 15/32 | (2006.01) |
| H02J 3/14 | (2006.01) |
| H05B 1/02 | (2006.01) |
| G05B 9/02 | (2006.01) |
| G05D 23/00 | (2006.01) |
| G05D 23/20 | (2006.01) |
| G05D 23/24 | (2006.01) |

(52) U.S. Cl.
CPC ............ *H05B 1/0263* (2013.01); *F24C 15/325* (2013.01); *G05D 23/20* (2013.01); *G05D 23/24* (2013.01); *H02J 3/14* (2013.01); *H05B 1/02* (2013.01); *Y04S 20/221* (2013.01); *Y04S 20/222* (2013.01)
USPC ............. 700/300; 700/79; 700/295; 219/492; 219/494

(58) Field of Classification Search
CPC ...... F24C 15/325; G05D 23/20; G05D 23/24; H02J 3/14; H05B 1/02; H05B 1/0263; Y04S 20/221; Y04S 20/222
USPC ..................... 700/79, 295, 300; 219/492, 494
See application file for complete search history.

(56) References Cited

U.S. PATENT DOCUMENTS 5,254,823 A * 10/1993 McKee et al. ................. 219/680
6,660,982 B2 * 12/2003 Thorneywork ............... 219/702
(Continued)

FOREIGN PATENT DOCUMENTS

| CN | 2069242 U | 1/1991 |
| CN | 2383451 Y | 6/2000 |
| CN | 1911142 A | 2/2007 |

(Continued)

*Primary Examiner* — Mohammad Ali
*Assistant Examiner* — Jennifer L Norton
(74) *Attorney, Agent, or Firm* — Rabin & Berdo, P.C.

(57) ABSTRACT

The present invention provides with a power saving method for the electrical heating food processing device of temperature-controlled, which applied the thermal sensor dynamic senses the temperature of the heater; and the microprocessor judges that whether the real-time sensed temperature signal is within the corresponding temperature interval, then deals with the data. The microprocessor judges that whether the continuous-time length of the corresponding temperature interval exceeds the preset time threshold on the basis of the judgment of the temperature interval. If does, reduce the temperature or shutdown the power, otherwise return to the normal working mode. It realizes automatically temperature reduction and automatically shutdown when the food processing device is unused. The temperature reduction automatically can reduce the temperature difference of the heater and the surrounding environment, which can realize the energy consumption reduction; the shutdown automatically can avoid energy wasting due to long period of empty load of the food processing device, which can realize the power saving.

1 Claim, 2 Drawing Sheets

(56) References Cited

U.S. PATENT DOCUMENTS

| | | |
|---|---|---|
| 8,087,407 B2 * | 1/2012 | Wiker et al. ............... 126/21 A |
| 2006/0081607 A1 | 4/2006 | Niiyama et al. |
| 2009/0089597 A1 * | 4/2009 | Sugita ........................ 713/320 |
| 2010/0187219 A1 * | 7/2010 | Besore et al. ............... 219/494 |
| 2011/0049124 A1 * | 3/2011 | Crayfourd .................. 219/400 |
| 2011/0320061 A1 * | 12/2011 | Chen .......................... 700/300 |

FOREIGN PATENT DOCUMENTS

| | | |
|---|---|---|
| CN | 2870684 Y | 2/2007 |
| CN | 1979053 A | 6/2007 |
| CN | 101366599 Y | 2/2009 |
| CN | 101369138 A | 2/2009 |
| CN | 201247403 Y | 5/2009 |
| JP | 2005203211 A | 7/2005 |
| JP | 2005204913 A | 8/2005 |

* cited by examiner

POWER SAVING METHOD FOR A TEMPERATURE-CONTROLLED ELECTRICAL HEATING FOOD PROCESSING DEVICE

FIELD OF THE INVENTION

The present invention relates to a power saving method for a temperature-controlled device, especially to a power saving method for a temperature-controlled electrical heating food processing device to prepare the food.

BACKGROUND OF THE INVENTION

The existing food processing device applies built-in heater to emit heat for food processing, and the most heater applies electrical heating. The heater is disposed with heating wire; when the heating wire is powered, it generates heat and makes the heater heating up, so as to prepare the food. To achieve that the temperature of the heater is within certain limits, the existing temperature controlling method applies thermal sensor (such as thermistor NTC) built in the heater to real-time sense the temperature of the heater. The microprocessor transmits temperature signal sensed from the thermistor to the food processing device, and the microprocessor will computational analyse the data. If the temperature sensed from the thermistor exceeds the upper limit value of the preset temperature interval, the microprocessor will transmit the control signal to the electrical heating control switch (such as a electrical relay) to cut off the switch. Then the heating wire will stop working, so with the fallen of the temperature of the heater to return to the preset temperature interval. If the temperature sensed from the thermal sensor is lower than the lower limit value of the preset temperature interval, the microprocessor will transmit control signal to the electrical heating control switch to turn on the switch. And the heating wire heats up with the raising of the temperature of the heater to reach to the preset temperature interval.

So the temperature of the heater keeps at a thermostatic range. When the temperature the thermal sensor sensed is within the preset temperature interval, the heater keeps at a thermostatic range by setting a heating period. That is the microprocessor transmitting the on/off control signal to the electrical heating control switch periodically to make the heating wire heating periodically, which makes the temperature of the heater keeps at a thermostatic manner. For example, the working temperature is set at 218° C., the heater will keep at 218° C. after the food processing device is powered unless the food processing device is shut off, whether the food processing device is in use or not. When the food processing device is off used, with the huge difference between the working temperature of the heater and the environment temperature, the abstraction of heat is quick, which results in great energy loose of the empty load (that is in unused status) and energy wasting.

SUMMARY OF THE INVENTION

The object of the present invention is to overcome the shortcomes of the existing technical proposal, providing with a power saving method for the electrical heating food processing device of temperature-controlled. The present invention will control the temperature of the heater to the low temperature interval when the food processing device is unused for a period time, then stop to heat and shut off when unused after a period of time, to achieve the object of energy saving.

The technical proposal of the present invention is:

A power saving method for the electrical heating food processing device of temperature-controlled includes the steps below:

a. Enter to the normal working mode, the preset on/off control signal is transferred to the heating control switch from the microprocessor to control the heater of the food processing device to heat in normal mode;

b. the thermal sensor in the food processing device real-time senses the heater temperature of the food processing device, then transmit the temperature value to the microprocessor, the microprocessor judges that whether the temperature value is within the preset first working temperature interval; if not, the microprocessor will clear the first time value, then return to the step a; if the temperature value is within the preset first working temperature interval, the microprocessor will accumulate the first time value, then go to the next step;

c. the microprocessor judges that whether the accumulated first time value exceeds the first time threshold; if not, return to the step a; if the accumulated first time value exceeds the first time threshold, go to the next step;

d. enter to the low-temperature working mode, the preset on/off control signal is transmitted to the heating control switch from the microprocessor, the heater of the food processing device performs the heating control in low-temperature mode, the temperature is controlled to be within the second temperature interval;

e. the thermal sensor in the food processing device real-time senses the heater temperature of the food processing device, then transmit the temperature value to the microprocessor, the microprocessor judges that whether the temperature value is within the preset second working temperature interval; if not, the microprocessor will clear the second time value, then return to the step a; if the temperature value is within the preset second working temperature interval, the microprocessor will accumulate the second time value, then go to the next step;

f. the microprocessor judges that whether the accumulated second time value exceeds the second time value; if not, then return to the step a; if the accumulated second time value exceeds the second time threshold, then go to the next step;

g. the microprocessor transmits control signal of automatic shutdown, then stop to heat to realize shutdown automatically.

The present invention provides with a power saving method for the electrical heating food processing device of temperature-controlled, which applies the thermal sensor (such as thermistor NTC) to real-time sense the temperature variation of the heater. The temperature signal of the thermal sensor is transmitted to the microprocessor 11, which will compute, analyse and deal with the data. The microprocessor generates control signal to control the heating of the heating wire by the electrical heating control switch (such as a relay). The first working temperature interval and the second one are preset value. The first working temperature interval is the temperature interval when the food processing device is in normal working status, with different usage of the food processing device, the temperature interval is different. The second working temperature interval is the temperature interval when the food processing device is situated in the low-temperature status. The second working temperature interval is lower than the first working temperature interval. The detail setting range varies with the difference of the food processing device and the power saving demand. The first time threshold and the second threshold are preset and stored in the microprocessor. The size of the value can be varied according to different demand. The first time threshold is used for the judgment of the first working temperature interval. If the continuous time of the first working temperature interval exceeds the first time threshold, the temperature of the food processing device is controlled to be fallen. The second time threshold is used for the judgment of the second working temperature interval. If the continuous time of the second working temperature interval exceeds the second time threshold, the food processing device is controlled to be shutdown.

The advantageous effects of the present invention are: the thermal sensor dynamic senses the temperature of the heater; and the microprocessor judges that whether the real-time sensed temperature signal is within the corresponding temperature interval, then deals with the data. The microprocessor judges that whether the continuous-time length of the corresponding temperature interval exceeds the preset time threshold on the basis of the judgment of the temperature interval. If does, reduce the temperature or shutdown the power, otherwise return to the normal working mode. It realizes automatically temperature reduction and automatically shutdown when the food processing device is unused. The temperature reduction automatically can reduce the temperature difference of the heater and the surrounding environment, which can realize the energy consumption reduction; the shutdown automatically can avoid energy wasting due to long period of empty load of the food processing device, which can realize the power saving. With the dynamic sensation, the power saving mode will be entered after long period of unused. When in the power saving mode, the shutdown mode will be entered after long period of unused. When used, it will return to the normal working status. The present invention realizes power saving while it will not affect the usage, having well power saving effect and used friendly.

The present invention will be further detailed descried with the drawings and the preferred embodiments; but the present invention of a power saving method for the electrical heating food processing device of temperature-controlled is not limited from the embodiments.

DETAILED DESCRIPTION OF THE PREFERRED EMBODIMENT

Figure 1:
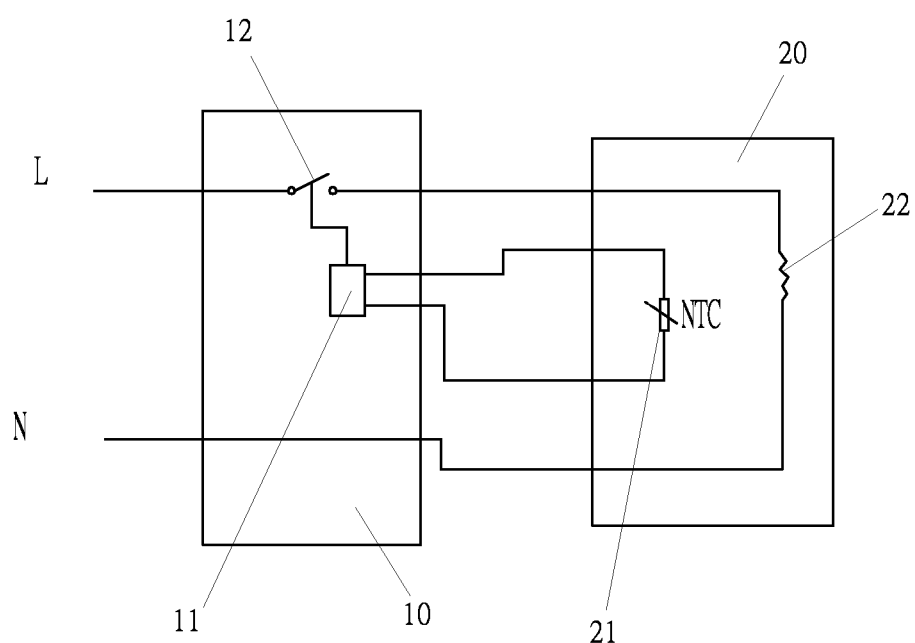
FIG. 1 illustrates the schematic diagram of the circuit control manner.

Refer to the FIG. 1, the schematic diagram of the circuit control manner of the power saving method in the present invention.

A circuit control panel 10 is disposed in the food processing device; the circuit control panel 10 is disposed with a microprocessor 11 to control the electrical heating control switch 12, which is realized by a relay or other element. The heater 20 is disposed with a heating wire 22, which connects to the power by the electrical heating control switch 12. If the electrical heating control switch 12 is closed, the heating wire 22 heats up with a current flowing, so that with the heating of the heater 20. If the electrical heating control switch 12 is break, the heater 20 is not heated by the heating wire 22, which has not current flowing; there is temperature difference between the heater 20 and the surrounding environment, so the temperature of the heater 20 will be fallen due to the heat exchange. A thermal sensor 21 is disposed in the heater 20 as well, and the thermal sensor 20 can apply thermistor or other elements. The thermal sensor 21 senses the temperature variation of the heater 20, then transmits the signal corresponding to the sensed temperature to the microprocessor 11 to process the data.

Figure 2:
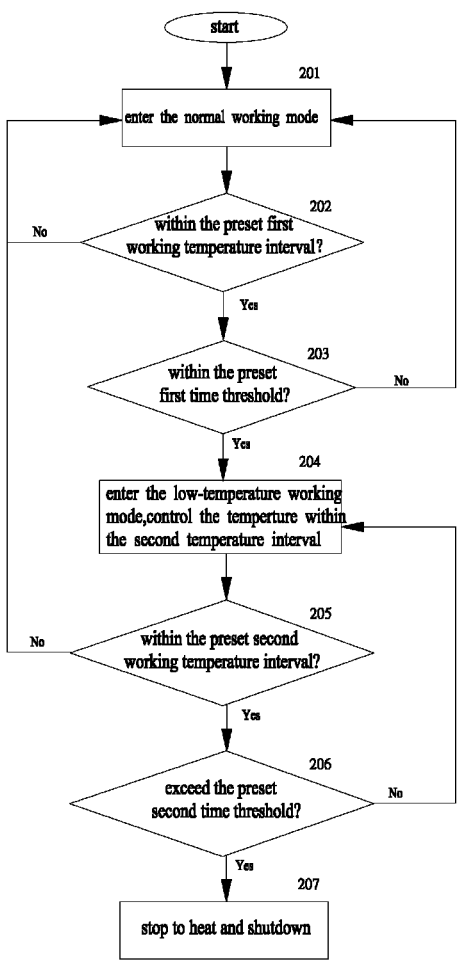
FIG. 2 illustrates the flow chart of the heating control.

Refer to the FIG. 2, a power saving methods for the electrical heating food processing device of temperature-controlled in the present invention includes steps below:

a. Enter to the normal working mode, the preset on/off control signal is transferred to the heating control switch 12 from the microprocessor 11 to control the heater 20 of the food processing device to heat in normal mode; as figured from the frame 201 in the FIG. 2;

In the normal working mode, the microprocessor 11 runs the normal working control procedure pre-programmed, which transmits the corresponding control signal to the electrical heating control switch 12 with the on/off control signal in a certain mode. So the temperature of the heater 20 will keeps in the first temperature interval. For example, the food processing device applies heating periodically, that is the microprocessor transmitting periodical control signal to the electrical heating control switch 12, making the electrical heating control switch 12 on/off periodically. The temperature of the heater 20 keeps in a certain ranges, and the time to close and to break of the electrical heating control switch 12 is set according to different working temperature intervals;

b. the thermal sensor 21 in the food processing device real-time senses the heater 20 temperature of the food processing device, then transmit the temperature value to the microprocessor 11, the microprocessor 11 judges that whether; as figured in the frame 202 in the FIG. 2; if the temperature value is not within the preset first working temperature interval, the microprocessor 11 will clear the first time value T1, then return to the step a; if the temperature value is within the preset first working temperature interval, the microprocessor will accumulate the first time value T1, then go to the next step;

When the food is put into the food processing device, the temperature of the heater 20 will drop quickly. The temperature of the heater 20 is not within the first working temperature interval, then return to the step a to continue the normal working mode. The food is prepared in the normal working mode status; if the food preparing is finished or the food processing device is empty loading, the temperature of the heater 20 will keep in the first working temperature interval;

c. the microprocessor 11 judges that whether; as figured in the frame 203 in the FIG. 2; if the accumulated first time value does not exceed the first time threshold, return to the step a; if the accumulated first time value exceeds the first time threshold, go to the next step;

d. enter to the low-temperature working mode, the preset on/off control signal is transmitted to the heating control switch 12 from the microprocessor 11, the heater 20 of the food processing device performs the heating control in low-temperature mode, the temperature is controlled to be within the second temperature interval; as figured in the frame 204 of the FIG. 2;

In the low-temperature mode, the microprocessor 11 runs the low-temperature mode control procedure pre-programmed, which transmits the corresponding control signal to the electrical heating control switch 12 with the on/off control signal in a certain mode. So the temperature of the heater 20 will keeps in the second temperature interval (that is the low-temperature interval).

e. the thermal sensor 21 in the food processing device real-time senses the heater 20 temperature of the food processing device, then transmit the temperature value to the microprocessor 11, the microprocessor 11 judges that whether the temperature value is within the preset second working temperature interval; as figured in the frame 205 of the FIG. 2; if the temperature value is not within the preset second working temperature interval, the microprocessor will clear the second time value, then return to the step a; if the temperature value is within the preset second working temperature interval, the microprocessor will accumulate the second time value, then go to the next step;

When the food processing device is in the low-temperature statue, the food to prepare is put into the food processing device, the temperature of the heater 20 will drop quickly, that is to say, the temperature of the heater 20 is not within the second working temperature interval, then return to the step a to continue the normal working mode. The food is prepared in the normal working mode status. If the food is not in the food processing device, the temperature of the food processing device will keep in the second working temperature interval;

f. the microprocessor 11 judges that whether the accumulated second time value exceeds the second time value; as figured in the frame 206 of the FIG. 2; if the accumulated second time value does not exceed the second time threshold, then return to the step a; if the accumulated second time value exceeds the second time threshold, then go to the next step;

g. the microprocessor 11 transmits control signal of automatic shutdown, then stop to heat to realize shutdown automatically, as figured in the frame 207 of the FIG. 2.

The present invention provides with a power saving method for the electrical heating food processing device of temperature-controlled, which applies the thermal sensor 21 (such as thermistor NTC) to real-time sense the temperature variation of the heater 20. The temperature signal of the thermal sensor 21 is transmitted to the microprocessor 11, which will compute, analyse and deal with the data. The microprocessor 11 generates control signal to control the heating of the heating wire 22 by the electrical heating control switch 12 (such as a relay). The first working temperature interval and the second one are preset value. The first working temperature interval is the temperature interval when the food processing device is in normal working status, with different usage of the food processing device, the temperature interval is different. The second working temperature interval is the temperature interval when the food processing device is situated in the low-temperature status. The second working temperature interval is lower than the first working temperature interval. The detail setting range varies with the difference of the food processing device and the power saving demand. The first time threshold and the second threshold are preset and stored in the microprocessor. The size of the value can be varied according to different demand. The first time threshold is used for the judgment of the first working temperature interval. If the continuous time of the first working temperature interval exceeds the first time threshold, the temperature of the food processing device is controlled to be fallen. The second time threshold is used for the judgment of the second working temperature interval. If the continuous time of the second working temperature interval exceeds the second time threshold, the food processing device is controlled to be shutdown.

INDUSTRIAL APPLICABILITY

The present invention provides with a power saving method for the electrical heating food processing device of temperature-controlled, which can reduce the temperature automatically and shutdown automatically when the food processing device is unused. The temperature reduction automatically can reduce the temperature difference of the heater and the surrounding environment, which can realize the energy consumption reduction; the shutdown automatically can avoid energy wasting due to long period of empty load of the food processing device, which can realize the power saving. The present invention is well industrial applicability.

What is claimed is:

1. A power saving method for the electrical heating food processing device of temperature-controlled, wherein the power saving method includes steps below:
   a. Enter to the normal working mode, the preset on/off control signal is transferred to the heating control switch from the microprocessor to control the heater of the food processing device to heat in normal mode;
   b. the thermal sensor in the food processing device real-time senses the heater temperature of the food processing device, then transmit the temperature value to the microprocessor, the microprocessor judges that whether the temperature value is within the preset first working temperature interval; if not, the microprocessor will clear the first time value, then return to the step a; if the temperature value is within the preset first working temperature interval, the microprocessor will accumulate the first time value, then go to the next step;
   c. the microprocessor judges that whether the accumulated first time value exceeds the first time threshold; if not, return to the step a; if the accumulated first time value exceeds the first time threshold, go to the next step;
   d. enter to the low-temperature working mode, the preset on/off control signal is transmitted to the heating control switch from the microprocessor, the heater of the food processing device performs the heating control in low-temperature mode, the temperature is controlled to be within the second temperature interval;
   e. the thermal sensor in the food processing device real-time senses the heater temperature of the food processing device, then transmit the temperature value to the microprocessor, the microprocessor judges that whether the temperature value is within the preset second working temperature interval; if not, the microprocessor will clear the second time value, then return to the step a; if the temperature value is within the preset second working temperature interval, the microprocessor will accumulate the second time value, then go to the next step;
   f. the microprocessor judges that whether the accumulated second time value exceeds the second time value; if not, then return to the step a; if the accumulated second time value exceeds the second time threshold, then go to the next step;
   g. the microprocessor transmits control signal of automatic shutdown, then stop to heat to realize shutdown automatically.

* * * * *